United States Patent [19]
Tabuchi et al.

[11] Patent Number: 5,568,794
[45] Date of Patent: Oct. 29, 1996

[54] ELECTRIC CIRCUIT DEVICE PROVIDED ON COMPONENTS NECESSARY FOR CONTROLLING ENGINE OF VEHICLE

[75] Inventors: Kenji Tabuchi, Hitachinaka; Yasushi Sasaki, Urizura-machi, both of Japan

[73] Assignee: Hitachi, Ltd., Tokyo, Japan

[21] Appl. No.: 426,382

[22] Filed: Apr. 21, 1995

[30] Foreign Application Priority Data

Apr. 28, 1994 [JP] Japan ................... 6-091061

[51] Int. Cl.⁶ ........................................... F02F 7/00
[52] U.S. Cl. ............................................ 123/195 E
[58] Field of Search ................. 123/195 E, 195 C, 123/198 E, 143 C; 439/34

[56] References Cited

U.S. PATENT DOCUMENTS

| | | | |
|---|---|---|---|
| 2,603,201 | 7/1952 | Kickhaefer | 123/195 E |
| 5,060,625 | 10/1991 | Bruning | 123/195 E |
| 5,203,292 | 4/1993 | Motose | 123/143 C |

FOREIGN PATENT DOCUMENTS

| | | | |
|---|---|---|---|
| 63-113764 | 7/1988 | Japan | 123/195 E |
| 4-32566 | 3/1992 | Japan | 123/195 E |
| 4-203437 | 7/1992 | Japan | 123/195 E |

*Primary Examiner*—Raymond A. Nelli
*Attorney, Agent, or Firm*—Antonelli, Terry, Stout & Kraus

[57] ABSTRACT

The work for connecting a wiring harness in assembling an engine, especially, in assembling components in an engine compartment, is simplified by connecting a wiring harness for transmitting electric signals at the same time the components are assembled. A member of a connector connected to a first harness is mounted on a jointing and attaching surface of an air suction pipe and the other member of the connector connected to a second harness is mounted on a jointing and attaching surface of a throttle body so that the connector members are joined and connected to each other at the same time when the air suction pipe and throttle body are joined and secured to each other. Thereby, the harness necessary for transmitting signals is connected at the time of assembly of the parts.

18 Claims, 6 Drawing Sheets

A-A CROSS SECTION

ELECTRIC CIRCUIT DEVICE PROVIDED ON COMPONENTS NECESSARY FOR CONTROLLING ENGINE OF VEHICLE

BACKGROUND OF THE INVENTION

The present invention relates to a structure for attaching to an engine components necessary for controlling the engine such as a sensor, control unit and the like mounted in an engine compartment, and more particularly to a method of connecting wires for transmitting electric signals between electric circuit devices.

In general, an engine control unit constructed as a microcomputer is placed inside a vehicle where the environmental conditions are comparatively good and sensors and actuators are placed inside the engine compartment of the vehicle, and are connected to a so-called wiring harness for transmitting signals. An example of an electronic control device, such as engine control unit, installed in an engine compartments is described, for example, in Japanese Utility Model Application Laid-Open No. 63-113764 (1988). Therein, a control unit is attached to the outer wall of a throttle body. The main throttle body and a housing for an electronic circuit are formed in one piece, and the electronic circuit is installed inside the housing with the gap between the housing and the electronic circuit being filled with a filler. Since the control unit is placed in the engine compartment, the wiring is extracted through a rubber mount which provides a waterproof connection.

A technology is described in Japanese Patent Application Laid-Open No.4-203437 (1992) where the cooling effect for electronic parts is improved by attaching a control device for a hot wire type air flow meter and the hot wire type air flow meter to an air cleaner body having a one-piece structure. This proposal serves only to cool the electronic parts in the control unit. Similarly, a technology aiming to cool electronic parts is described in Japanese Utility Model Application Laid-Open No. 4-32566 (1992). Therein, electronic parts having high heat generating rates are mounted on boards made of non-organic material and parts having comparatively low heat generating rates are mounted on boards made of organic material to be installed inside an engine compartment.

In the conventional technologies described above, an electronic control device is installed inside an engine compartment and the electronic parts are cooled by utilizing the suction air of the engine. For example, in the case of installing an electronic control device in an air cleaner, the length of the wiring between the components, that is, the length of the wiring harness, is shortened only a little since electric signals have to be transmitted between these components. Therefore, the effect of installing the electronic control device inside the engine compartment is not so large. Further, there is not so large an effect from the point of view of the work required for providing wiring between the components. For example, the total amount of work is not reduced, since work is required for setting the components, for attaching the connectors and for wiring the harness. Furthermore, since the components for engine controlling are connected with wiring harnesses, there are a lot of harnesses running around in the space inside the engine compartment. Further, a break is apt to occur in the wiring due to vibration or repeated contact with an edge of a part or other object. As described above, in the aforementioned conventional technologies, there still remains a significant amount of work and bother in setting components and wiring, and there still is a problem in reliability.

SUMMARY OF THE INVENTION

The object of the present invention is to provide an extremely useful electric circuit device which makes possible a simplified connecting of wiring harnesses.

In order to attain the above object, according to the present invention, there is provided the following construction. The basic idea is that, for example, in constructing an air suction system for use in an engine, a signal transmitting system necessary for a particular type of control can be constructed by attaching parts of the signal transmitting system to components of the air system. More particularly, the structure is such that a connector has corresponding connecting parts attached to respective wiring harness and mounted on connecting surfaces of components to be joined and secured to one another, whereby attaching said components to each other automatically effects connection of a wiring harness to the other wiring harness. Further, a connecting part and or the harness connected to said connecting part maybe formed in one piece with the component by integration or molding.

A connecting part of a connector is provided on the attaching surface of each part, and a harness for transmitting signals is connected to each of said connecting parts of the connector, which are formed in one piece with the respective part. Therefore, connection of a circuit can be performed automatically at the same time when parts are attached to each other. It may be possible that means for attaching a part is separately provided and the connecting described above performs only an electrical connection. In the both cases, connection of a circuit for transmitting electrical signals using a harness can be performed at the same time when parts are attached to each other.

DETAILED DESCRIPTION OF THE PREFERRED EMBODIMENTS

Figure 1:
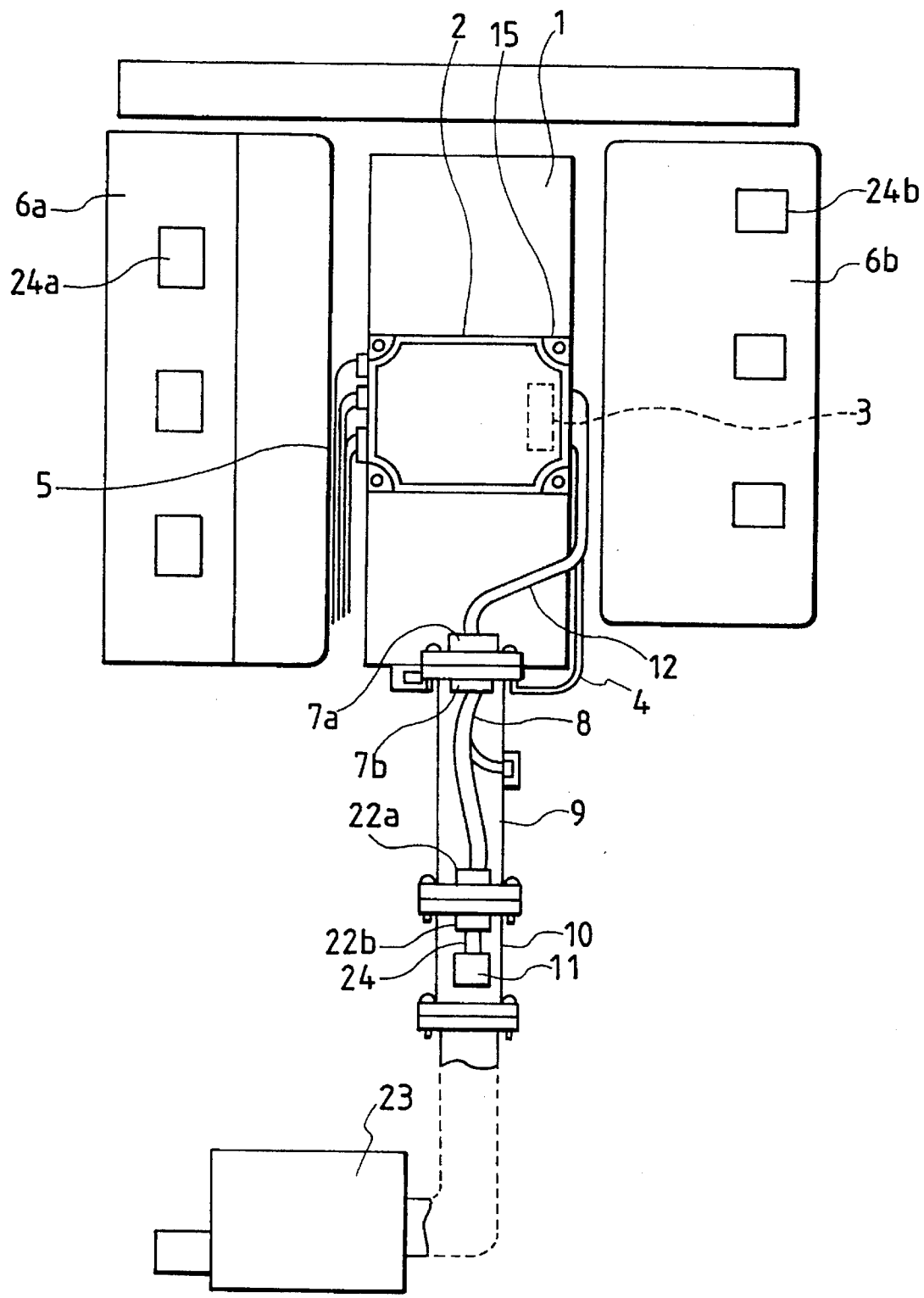
FIG. 1 is a top view showing a control unit attached to a V-type engine.

The embodiment according to the present invention will be described below, reference to the accompanying drawings. FIG. 1 shows a control unit provided in a recessed portion between both banks of a V type engine. In FIG. 1, a control unit 2 is attached to an air suction pipe 1. The reference character 3 identifies a connector which provide electrical connection between the control unit 2 and external elements. The reference character 4 represents a harness. The connectors 3 are placed at locations where the control unit 2 and the air suction pipe 1 are facing each other, and their connection is performed automatically at the same time when the control unit 2 is attached to the suction pipe 1. The reference character 15 represents a fixing-purpose-only screw for fixing the control unit 2 on the suction pipe 1. The connector 3 may also serve to fix the control unit 2 to the air suction pipe 1 if the structure of the connector is formed in such a way as to have a securing function. However, the possibility that this will cause trouble in maintaining a connection of the parts will be increased during use, since vibration is large in an engine compartment. Therefore, it is better to secure the control unit 2 using fixing-purpose-only screws 15 in order to attain a high reliability in the attaching of the parts. The reference characters 6a, 6b indicate the engine portions of the respective banks of the V type engine. The reference character 5 designates a wiring harness for effecting electrical connection between the control unit 2 and other parts. The wiring harness serves to connect parts which cannot be integrated within the part member, and includes a power supplying line. The reference characters 7a, 7b are connector members to connect a signal line at the same time when the air suction pipe 1 and the throttle body 9 are joined and secured to each other. The connector members are provided in both the air suction pipe 1 and the throttle body 9 to connect a harness 8 to a harness 12. In joining the throttle body 9 and a hot wire body 10, connector members 22a, 22b connect the harness 8 to a harness 24. The connector members are provided in the throttle body side and the hot wire body side, respectively. The reference character 11 designates an air flow rate sensor, which, in this case, is a hot wire type sensor.

Figure 2A:
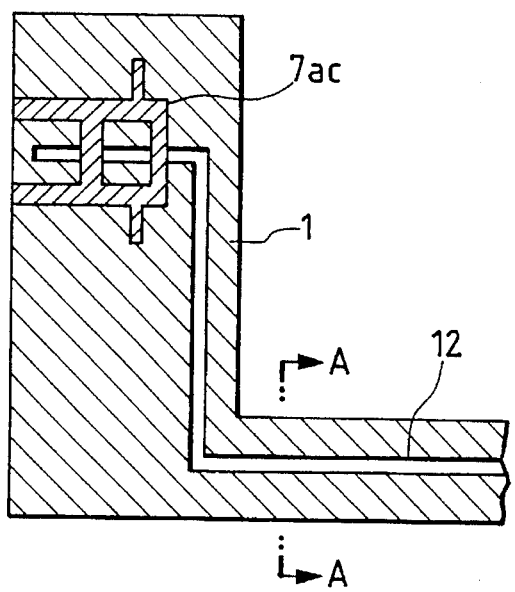
FIG. 2(A) is a side view showing a connector and a connector containing a harness and FIG. 2(B) is a cross section taken along the line A—A of FIG. 2(A).
Figure 2B:
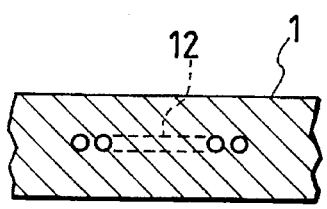

As seen in FIG. 1, the harness 12 and the harness 8 are laid on the air suction pipe 1 and the throttle body 9; respectively. However, the harness may be integrated into an adjacent component, such that the air suction pipe 1 incorporates the harness 12, as shown in FIG. 2 (A) and FIG. 2 (B). FIG. 2 (B) is a cross-sectional view taken on the plane of the line A—A' of FIG. 2 (A). The reference character 7ac identifies a connector member embedded in the air suction pipe 1. The throttle body 9 may be provided with a similar structure to incorporate the other member of the connector. In a case where the air suction pipe 1 or the throttle body 9 is formed of resin, it is possible to form a harness having a high reliability by integrating the harness into the component so as not to expose it to the environment. By similarly forming the throttle body 9 so as to embed the harness 8 therein, the same effect as above can be obtained.

Figure 3:
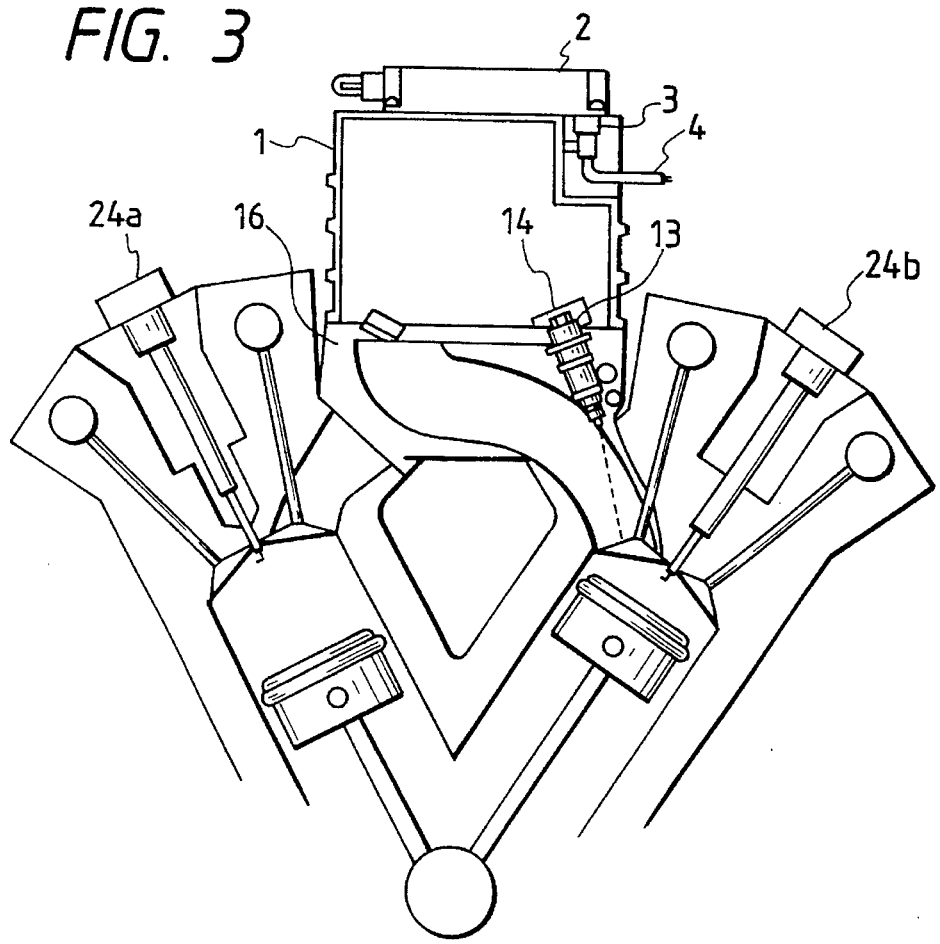
FIG. 3 is a partial cross-sectional view showing the control unit attached to the V type engine of FIG. 1 as seen from the front side.
Figure 4:
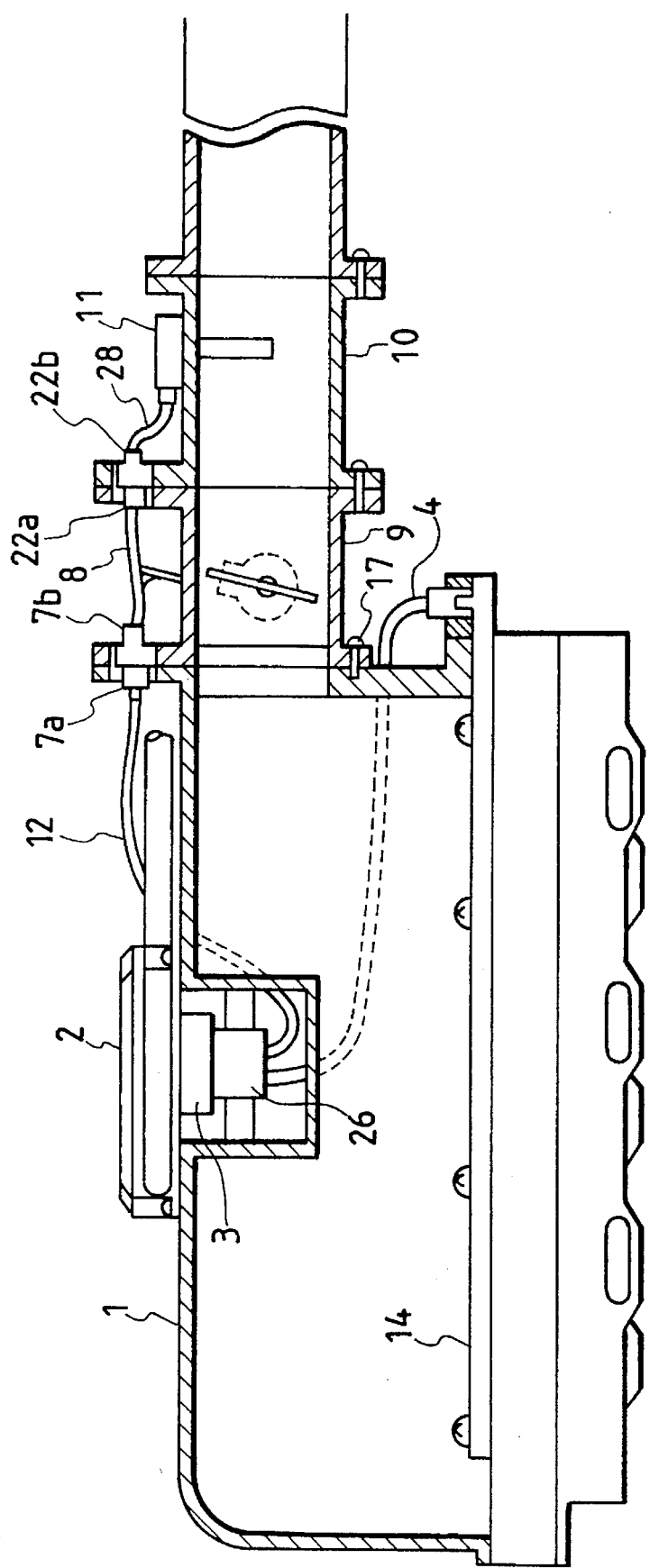
FIG. 4 is a cross-sectional view showing the control unit attached to the V type engine of FIG. 3 as seen from the side direction.
Figure 5:
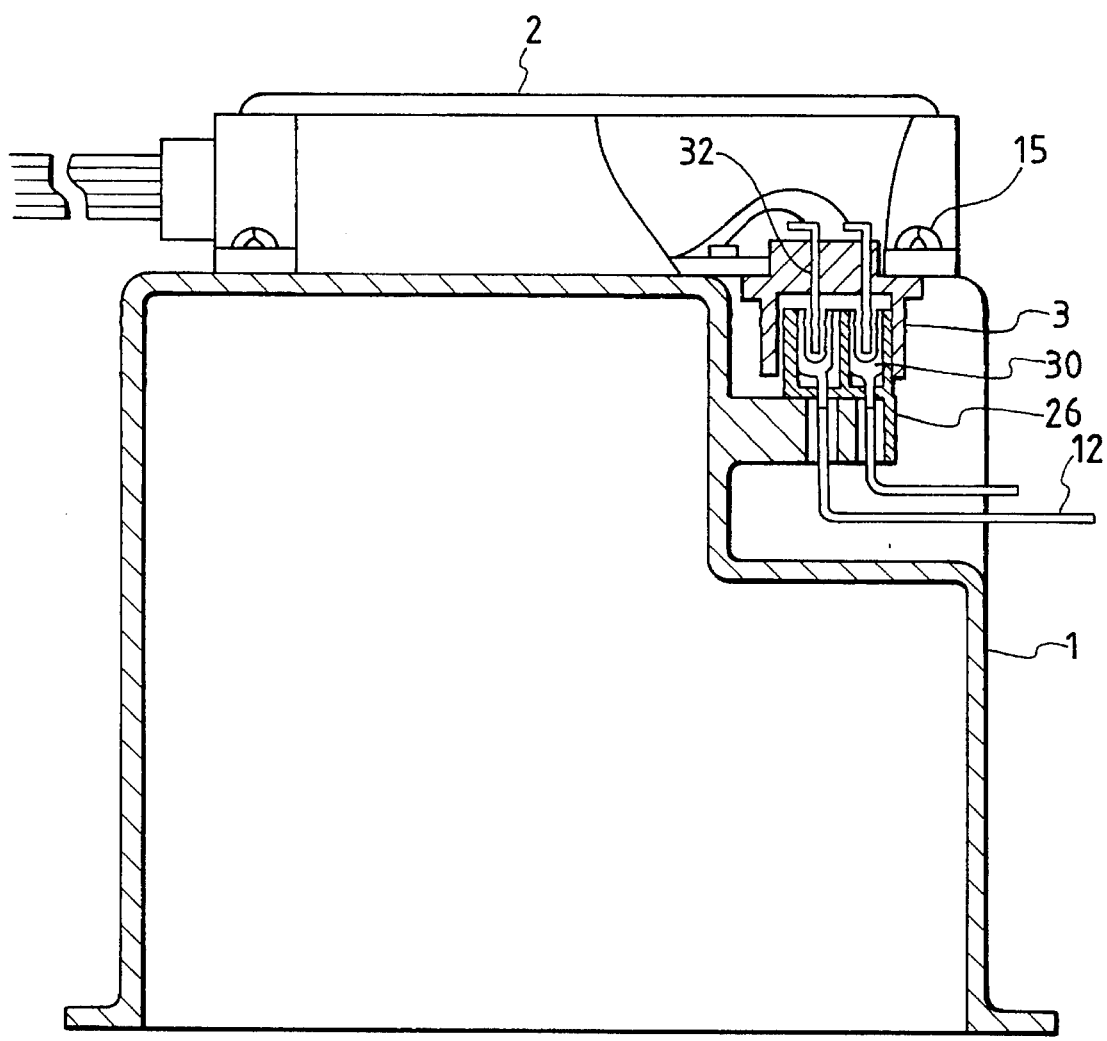
FIG. 5 is an enlarged view of the connector 3 shown in FIG. 4.

FIG. 3 is a cross-sectional front view of FIG. 1. The reference character 16 represents an intake manifold, the reference characters 24a, 24b designate ignition coils, the reference character 13 identifies an injector, and the reference character 14 represents a fuel gallery. The control unit 2 is placed in the middle of the V-type engine. FIG. 4 is a cross-sectional view showing the attaching position of the control unit. In this embodiment, a connector 26 mounted in a recess in the side of the air suction pipe 1 and a connector 3 provided on the control unit 2 are joined. The control unit 2 is fixed to the air suction pipe 1 using fixing-purpose-only screws 15. At the same time, the connector 3 and the connector 26 are joined and connected to complete electrical connection of the harness 12 to the control unit 2. By joining the throttle body 9 and the air suction pipe 1, the connector members 7a, 7b are connected. In this embodiment, the connector members 7a, 7b connected to the harnesses 12 and 8 are embedded in the throttle body 9 and the air suction pipe 1, respectively. It can be understood that the harnesses are connected automatically at the same time when the throttle body 9 and the air suction pipe 1 are assembled. FIG. 5 is an enlarged view showing the connector members 3 and 26. The reference characters 30, 32 represent connector pins. Connection is performed by surface contact of the pins.

Figure 6:
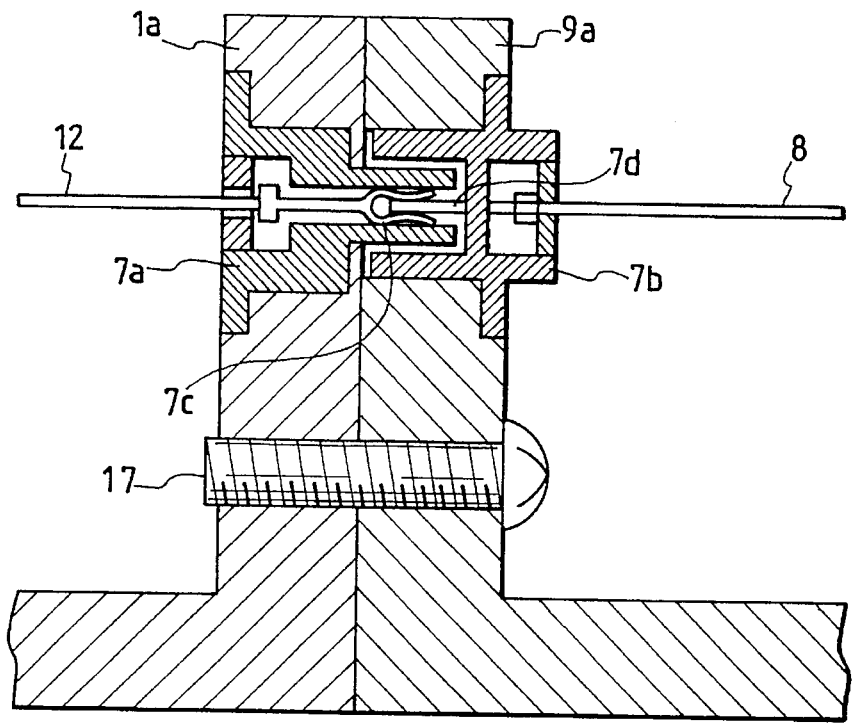
FIG. 6 is an enlarged cross-sectional view showing a jointing portion of an air suction pipe portion and a throttle body.
Figure 7:
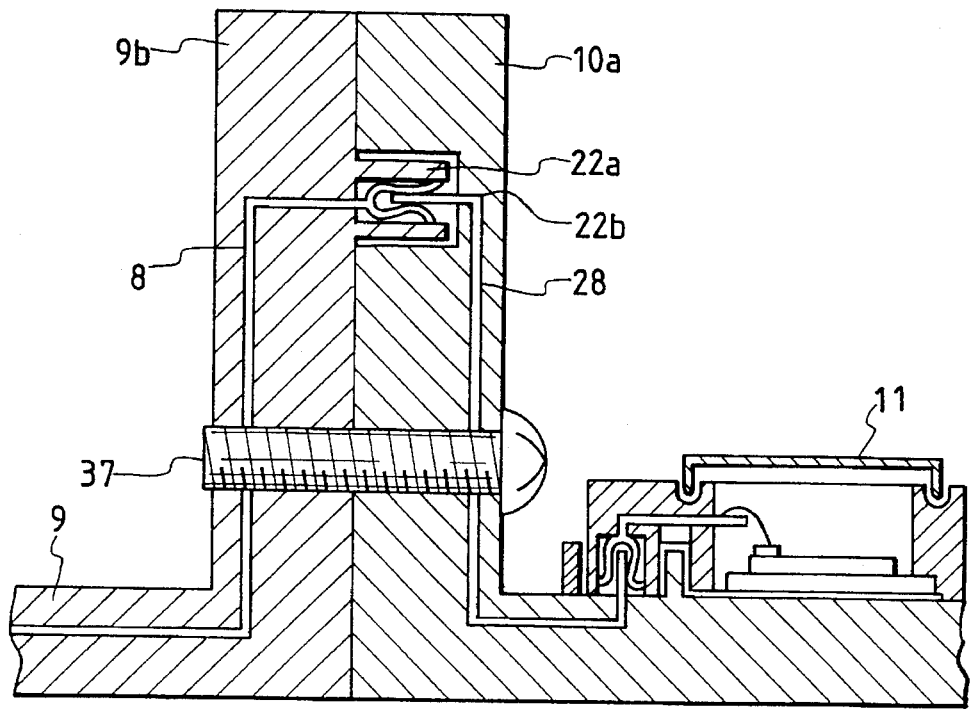
FIG. 7 is an enlarged cross-sectional view showing a jointing portion of a throttle body and a hot wire body.

FIG. 6 is a partially enlarged view showing the junction of the air suction pipe 1 and the throttle body 9 and the connection of the connector 7a, 7b and the harnesses 12, 8. The connector members 7a, 7b are integrally formed in a rim part 9a of the throttle body 9 and a rim part 1a of the air suction pipe 1. The reference character 17 is a screw with which the bodies described above are joined and attached. The harness 8 is connected to a connector pin 7d. The connector pin 7d is contacted and connected to a pin 7c at the receiving side facing the connector pin 7d at the same time when the two bodies are joined. In this embodiment, the harness is laid on the outer side of the body. However, the harness may be integrated into the component such that the body contains the harness. FIG. 7 is an enlarged cross-sectional view showing a joining portion of a throttle body 9 and a hot wire body 10, and a connecting portion of connector members 22a, 22b and harnesses 8, 28. The reference character 37 is a screw for securing the bodies. In this embodiment, the connectors are of an integrated type and the harnesses are of an embedded type. The harness 8 is embedded inside the throttle body, that is, it is contained between the outer and the inner peripheries within the piece. Similarly, the harness 28 is contained inside the hot wire body. In this way, it is possible to protect the harnesses from failure, since the harnesses are not laid on the outer portion of the bodies.

Figure 8A:
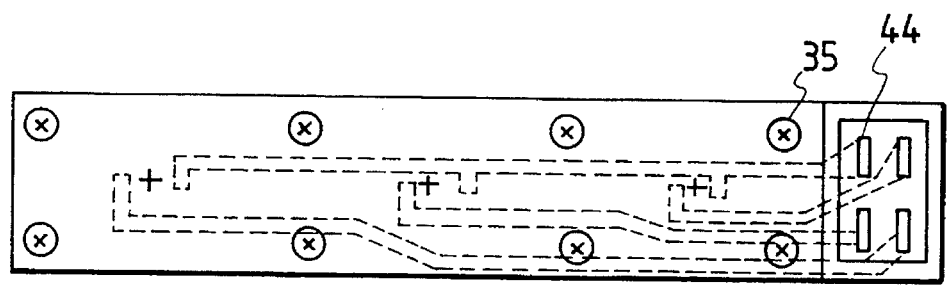
FIG. 8(a) is a top view showing an attaching portion of an injector and FIG. 8(b) is a side view thereof.
Figure 8B:
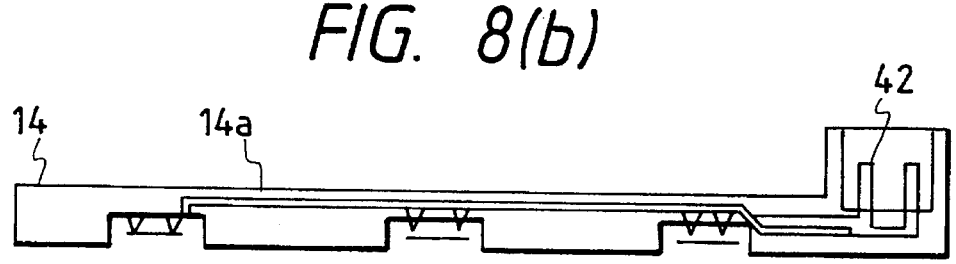
Figure 9:
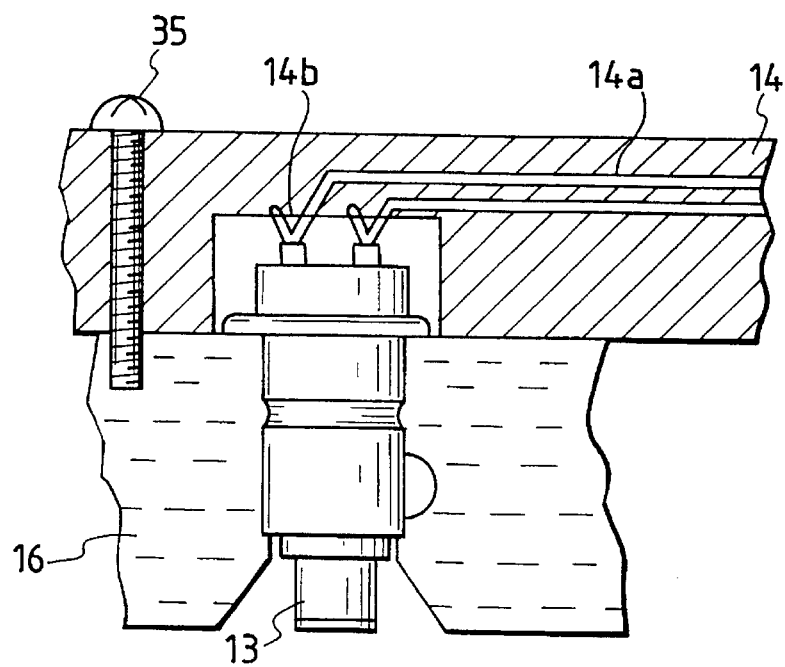
FIG. 9 is an enlarged cross-sectional view showing the jointing portion of an injector and a harness.

FIG. 8(a) FIG. 8(b) and FIG. 9 show an embodiment for attaching to an injector. The embodiment shows a fuel injection signal harness of the integrated type. The reference character 35 indicates a fixing screw, and the reference character 44 represents a connector pin. The reference character 14 identifies a pushing plate for fixing an injector, the reference character 14a is designates a harness for a fuel injection signal, and the reference character 14b designates a connecting portion of a harness for an injector 13. In this embodiment, the harness is also effectively protected from failure since the harness is not laid on the outside. FIG. 9 is a cross-sectional view showing the injector and the harness.

According to the present invention, since connection of the harness can be performed at the same time when the component is attached, it is possible to provide an extremely useful electric circuit device capable of simplifying connecting of the harnesses. Further, it is possible to form a harness having a high reliability by forming the harness integrally with a component which carries it.

What is claimed is:

1. An electric connector attached to a component necessary for controlling an engine and being disposed in an engine compartment having a wiring harness connector mounted on a surface of said engine compartment facing said component, wherein:

a further harness connector is mounted on a surface of said component facing said electric connector, and a wiring harness is connected to said further harness connector provided on a connected surface facing said connecting surface of said component, whereby connection of the electric connector to said wiring harness is performed when said connectors are simultaneously connected upon attaching of said electric connector to said component.

2. An electric connector according to claim 1, wherein:
means for attaching said electric connector to said component is provided separately from said harness connectors.

3. An electric connector according to claim 1, wherein:
said component has a mounting part for coupling to a corresponding mounting part provided on the said electric connector, said wiring harness connected to said further harness connector and/or said wiring harness connector thereof being integrated into said mounting part of said component.

4. An electric connector according to claim 3, wherein:
the wiring harness is molded in said wiring harness connector or said mounting member thereof.

5. An electric connector according to claim 1, wherein:
said engine is a V-type engine, and said electric connector is an engine control unit of said component and is mounted between banks of said V-type engine.

6. An electric connector according to claim 1, wherein:
rims are provided as jointing portions on both said components represented by a suction pipe introducing suction air into said engine and a throttle body for regulating suction air flow rate, and additional connectors for connecting to said wiring harness are provided in the rim of the throttle body.

7. An electric connector according to claim 6, wherein:
said additional connectors parts are integrated into said rims parts.

8. An electric connector according to claim 1, wherein:
rims are provided as jointing portions on both a throttle body for regulating suction air flow rate introducing suction air into said engine and a hot wire body for measuring suction air flow rate, and additional connectors for connecting to the wiring harness are provided in the rim of the throttle body and in the rim of the hot wire body.

9. An electric connector according to claim 8, wherein:
said additional connectors are integrated into said rims.

10. An electric connector according to claim 8, wherein:
said electric connector is at least one of a sensor, an actuator and an electronic control unit.

11. A wiring arrangement for components for control of an engine mounted in an engine compartment of a vehicle, comprising:
an engine control component;
a member providing a mounting surface for said engine control component within said engine compartment;
an electrical connector for a wiring harness, said electrical connector having a first connector part carried by said mounting surface of said member and a second connector part carried by said component at a position thereof in which said first and second connector parts are joined in engagement when said component is mounted on said mounted surface; and
a wiring harness electrically connected to said first connector part.

12. A wiring arrangement according to claim 11, further comprising means for attaching said engine control component to said mounting surface of said member so that said first and second connector parts are joined in engagement, thereby electrically connecting said wiring harness to said engine control component when said component is mounted on said mounting surface.

13. A wiring arrangement according to claim 11, wherein said member is a suction pipe for introducing air into said engine.

14. A wiring arrangement according to claim 13, wherein at least one of said wiring harness and said second connector part is integrated into said suction pipe.

15. A wiring arrangement according to claim 13, further comprising:
an additional electrical connector having third and fourth connector parts;
a throttle body mounted on said suction pipe for regulating suction air flow rate, said suction pipe carrying said third connector part which is electrically coupled to said wiring harness at an end opposite said second connector part and said throttle body carrying said fourth connector part so that said third and fourth connector parts are joined in engagement when said throttle body is mounted on said suction pipe; and
a further wiring harness electrically connected to said fourth connector part.

16. A wiring arrangement according to claim 15, wherein at least one of said further wiring harness and said fourth connector part is integrated into said throttle body.

17. A wiring arrangement according to claim 15, further comprising:
a further electrical connector having fifth and sixth connector parts;
a hot wire body mounted on said throttle body and having a hot wire device for measuring suction air flow rate, said throttle body carrying said fifth connector part which is electrically coupled to said further wiring harness at an end opposite said fourth connector part, and said hot wire body carrying said sixth connector part so that said fifth and sixth connector parts are joined in engagement when said hot wire body is mounted on said throttle body; and
another wiring harness electrically connecting said sixth connector part to said hot wire.

18. A wiring arrangement according to claim 17, wherein at least one of said another wiring harness and said sixth connector part is integrated into said hot wire body.

* * * * *